No. 759,091. PATENTED MAY 3, 1904.
F. A. GARDNER.
AUTOMOBILE.
APPLICATION FILED SEPT. 22, 1903.
NO MODEL.
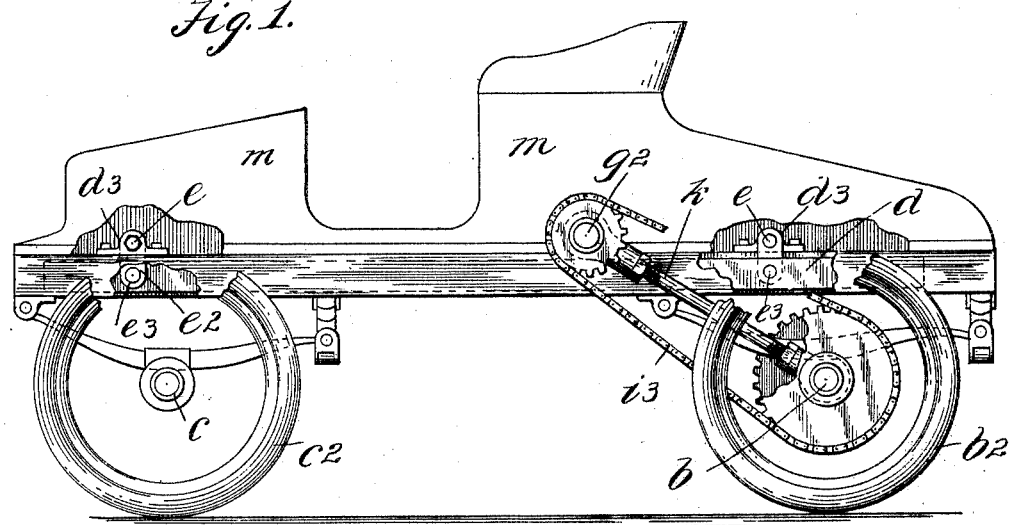
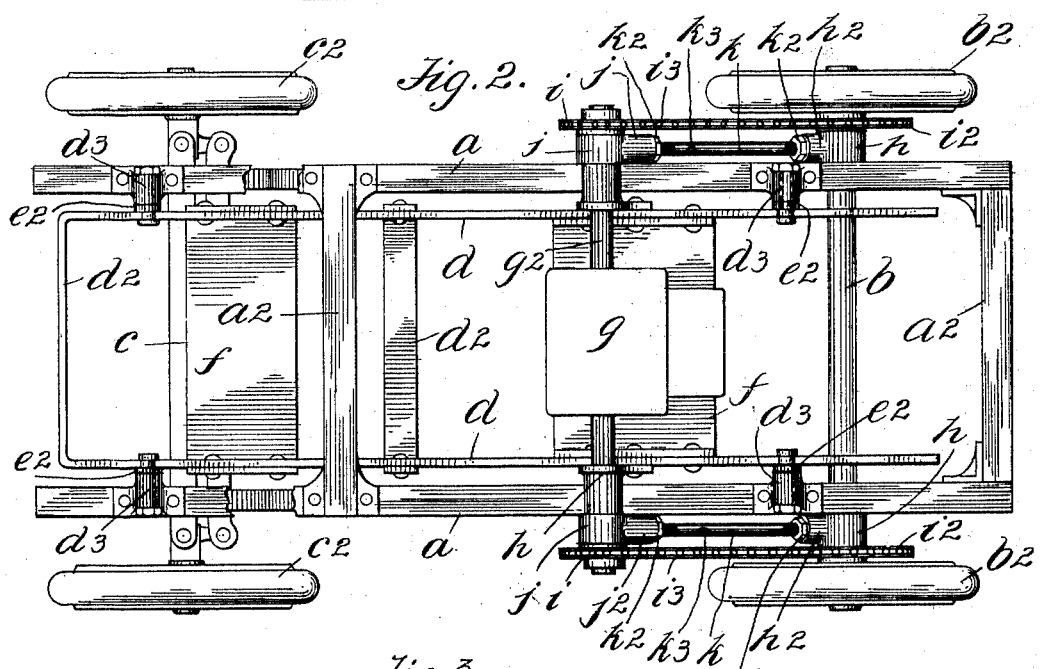
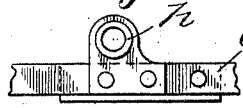
WITNESSES
F. A. Stewart
C. E. Mulreany
INVENTOR
Frederick A. Gardner
BY Edgar Tate & Co.
ATTORNEYS
THE NORRIS PETERS CO., PHOTO-LITHO., WASHINGTON, D. C.

No. 759,091. Patented May 3, 1904.

UNITED STATES PATENT OFFICE.

FREDERICK A. GARDNER, OF CATSKILL, NEW YORK.

AUTOMOBILE.

SPECIFICATION forming part of Letters Patent No. 759,091, dated May 3, 1904.

Application filed September 22, 1903. Serial No. 174,172. (No model.)

*To all whom it may concern:*

Be it known that I, FREDERICK A. GARDNER, a citizen of the United States, residing at Catskill, in the county of Greene and State of New York, have invented certain new and useful Improvements in Automobiles, of which the following is a specification, such as will enable those skilled in the art to which it appertains to make and use the same.

The object of this invention is to provide an improved truck frame or frames for automobiles and other self-propelling road-vehicles, comprising a main frame and a supplemental inner frame on which the operative parts of the propelling mechanism are mounted, the supplemental frame being movable of the main frame and adjustable thereon or therein so as to provide for the tightening of the drive-chains by which the power-shaft is geared in connection with the rear axle of the vehicle.

The invention is fully disclosed in the following specification, of which the accompanying drawings form a part, in which the separate parts of my improvement are designated by suitable reference characters in each of the views, and in which—

Figure 1 is a side view of the frame or body portion of an ordinary automobile made according to my invention, part of the construction being broken away; Fig. 2, a plan view thereof, and Fig. 3 a side view of the detail of the construction.

In the practice of my invention I provide a main truck-frame comprising two parallel side members $a$, connected by one or more cross members $a^2$, which may be located at any desired point, and I have also indicated in the drawings the rear axle $b$ and front axle $c$, which are respectively provided in the usual manner with the rear road-wheels $b^2$ and the front road-wheels $c^2$.

Within the main truck-frame is mounted a supplemental frame comprising two parallel bars $d$, rigidly connected by cross members $d^2$ or in any desired manner. The side bars $a$ of the main truck-frame are provided with raised bearings $d^3$, in which are mounted short journals $e$, from which are suspended links $e^2$, from the lower ends of which are suspended the side bars $d$ of the supplemental truck-frame, as shown at $e^3$, and as thus supported the supplemental truck-frame is free to swing forwardly and backwardly within certain limits. The supplemental truck-frame is also provided with transverse plates $f$, which form supports for the operative parts of the propelling mechanism, and on the rear transverse plate $f$ is mounted a motor $g$ of any preferred construction provided with a main power-shaft $g^2$. The main power-shaft $g^2$ is supported by raised bearings $h$, secured to the sides of the supplemental truck-frame $d$, and as thus constructed it will be seen that the motor $g$ and main power-shaft $g^2$, which constitute the motor-shaft, are also free to move forwardly and backwardly with the supplemental truck-frame.

The main power-shaft $g^2$ is provided at each end with a sprocket or gear-wheel $i$, and the rear axle of the vehicle is provided with corresponding sprockets or gear-wheels $i^2$, and these wheels at each side are geared in connection by drive-chains $i^3$. The rear axle $b$ is also provided with two collars $h$, having forwardly-directed tubular bearings $h^2$, and the power-shaft $g^2$ is provided with two similar collars $j$, having backwardly-directed screw-threaded tubular bearings $j^2$, and into these bearings $h^2$ and $j^2$ at both sides are screwed rods or bars $k$, the ends of which are provided with reversed threads and with set-nuts $k^2$, and by turning the rods or bars $k$ the position of the supplemental truck-frame and the main power-shaft $g^2$ may be adjusted forwardly and backwardly, as will be readily understood, the direction of this movement depending on the direction in which the rods or bars $k$ are turned. These rods or bars $k$, as shown in the drawings, are provided with transverse holes $k^3$, adapted to receive the end of a crank-pin or similar device whereby they may be turned; but any suitable means may be provided for turning these rods or bars.

It will be understood that the operative parts of the propelling mechanism whatever they may be are mounted on the supplemental frame, while the bed proper or superstructure (shown at $m$ in Fig. 1) is mounted on the main truck-frame, and provision is made in the bed proper or superstructure whereby the supplemental truck-frame and shaft $g^2$ may be adjusted. It will also be understood that this movement of the supplemental truck-frame and the motor and power shaft $g^2$ is very slight, all that is necessary being to tighten the drive-chains $i^3$ or loosen them, as may be desired.

Having fully described my invention, what I claim as new, and desire to secure by Letters Patent, is—

1. In an automobile or similar road-vehicle, a main truck-frame provided with front and rear axles and with side bearings, short journals mounted in said bearings and projecting inwardly, links suspended from said journals, a supplemental frame suspended by said links within said main frame, a motor mounted on the supplemental frame and provided with a transverse power-shaft, means for gearing the power-shaft of the motor in connection with the rear axle, and means for adjusting the supplemental frame longitudinally of the main frame, substantially as shown and described.

2. In an automobile or similar road-vehicle, a main truck-frame provided with front and rear axles and with side bearings, short journals mounted in said bearings and projecting inwardly, links suspended from said journals, a supplemental frame suspended by said links within said main frame, a motor mounted on the supplemental frame and provided with a transverse power-shaft, means for gearing the power-shaft of the motor in connection with the rear axle, and means for adjusting the supplemental frame longitudinally of the main frame, consisting of tubular bearings mounted on the ends of the power-shaft of the motor, similar bearings mounted on the rear axle, said tubular bearings being screw-threaded internally, and rods or bars mounted in said tubular bearings the ends of which are provided with opposite threads, said rods or bars being adapted to be turned so as to adjust the position of the supplemental frame, substantially as shown and described.

In testimony that I claim the foregoing as my invention I have signed my name, in presence of the subscribing witnesses, this 21st day of September, 1903.

FREDERICK A. GARDNER.

Witnesses:
 F. A. STEWART,
 C. E. MULREANY.